（12）United States Patent
Wang et al.

(10) Patent No.: US 11,550,030 B2
(45) Date of Patent: Jan. 10, 2023

(54) FREQUENCY-OFFSET SELF-INJECTION-LOCKED RADAR

(71) Applicant: NATIONAL SUN YAT-SEN UNIVERSITY, Kaohsiung (TW)

(72) Inventors: Fu-Kang Wang, Kaohsiung (TW); Kuan-Hung Chen, Kaohsiung (TW); Pin-Hsun Juan, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 214 days.

(21) Appl. No.: 17/106,380

(22) Filed: Nov. 30, 2020

(65) Prior Publication Data

US 2022/0146624 A1 May 12, 2022

(30) Foreign Application Priority Data

Nov. 12, 2020 (TW) .................................. 109139609

(51) Int. Cl.
*G01S 7/35* (2006.01)
*G01S 13/536* (2006.01)
*G01S 7/03* (2006.01)
*G01S 13/58* (2006.01)
*G01S 13/88* (2006.01)

(52) U.S. Cl.
CPC ............ *G01S 7/354* (2013.01); *G01S 13/536* (2013.01); *G01S 7/03* (2013.01); *G01S 13/583* (2013.01); *G01S 13/88* (2013.01)

(58) Field of Classification Search
CPC . G01S 7/35; G01S 7/354; G01S 7/356; G01S 7/352; G01S 7/03; G01S 13/536; G01S 13/583; G01S 13/88; H03L 7/24

USPC .................................. 342/100, 194, 175, 21
See application file for complete search history.

(56) References Cited

U.S. PATENT DOCUMENTS

| 4,743,907 A * | 5/1988 | Gellekink ............... G01S 13/87 342/80 |
| 7,656,205 B2 * | 2/2010 | Chen ...................... H03K 21/08 327/117 |
| 8,305,116 B2 * | 11/2012 | Jang ...................... H03B 5/1228 327/117 |
| 8,736,326 B1 * | 5/2014 | Horng .................... H03L 7/185 331/25 |

(Continued)

FOREIGN PATENT DOCUMENTS

TW  201212528 A1  3/2012
TW  202037084 A   10/2020

OTHER PUBLICATIONS

Taiwanese Office Action dated Feb. 8, 2021 for Taiwanese Patent Application No. 109139609, 6 pages.

(Continued)

*Primary Examiner* — Erin F Heard
*Assistant Examiner* — Michael W Justice
(74) *Attorney, Agent, or Firm* — Demian K. Jackson; Jackson IPG PLLC

(57) ABSTRACT

In a frequency-offset self-injection-locked (FOSIL) radar, a first mixer is provided to mix a first oscillation signal of a first injection-locked oscillator (ILO) and a second oscillation signal of a second ILO so as to cancel out the frequency drifts of the first and second oscillation signals. Accordingly, the transmit frequency of the FOSIL radar can remain constant to mitigate the EMI issue.

11 Claims, 9 Drawing Sheets

(56) References Cited

U.S. PATENT DOCUMENTS

| | | | | |
|---|---|---|---|---|
| 8,917,759 B2* | 12/2014 | Xu | .................. | H04L 27/2071 |
| | | | | 375/221 |
| 8,971,389 B2* | 3/2015 | Okada | .................. | H03B 5/1253 |
| | | | | 375/219 |
| 8,975,973 B2* | 3/2015 | Sato | .................. | H03B 19/00 |
| | | | | 331/172 |
| 9,603,555 B2* | 3/2017 | Horng | .................. | A61B 5/0816 |
| 10,763,872 B1* | 9/2020 | Wang | .................. | G01S 13/88 |
| 2012/0062287 A1* | 3/2012 | Jang | .................. | H03B 19/14 |
| | | | | 327/156 |
| 2013/0141143 A1* | 6/2013 | Sato | .................. | H03L 7/24 |
| | | | | 327/141 |
| 2013/0195157 A1* | 8/2013 | Xu | .................. | H04L 27/2272 |
| | | | | 375/219 |
| 2014/0016731 A1* | 1/2014 | Okada | .................. | H03B 27/00 |
| | | | | 375/375 |
| 2014/0123763 A1* | 5/2014 | Horng | .................. | G01H 3/00 |
| | | | | 73/657 |
| 2020/0295770 A1* | 9/2020 | Wang | .................. | H04L 27/22 |

OTHER PUBLICATIONS

Pin-Hsun Juan et al., Frequency-Offset Self-Injection-Locked (FOSIL) Radar for Noncontact Vital Sign Monitoring, 2020 IEEE/MTT-S International Microwave Symposium (IMS), Aug. 4-6, 2020.

\* cited by examiner

FREQUENCY-OFFSET SELF-INJECTION-LOCKED RADAR

FIELD OF THE INVENTION

This invention generally relates to a self-injection-locked radar, and more particularly to a frequency-offset self-injection-locked (FOSIL) radar.

BACKGROUND OF THE INVENTION

Self-injection-locked (SIL) radar is a continuous-wave (CW) Doppler radar in that the Doppler signal with phase shift caused by subject's movement is injected into an oscillator to allow the oscillator to have a frequency drift. The SIL radar used to detect tiny vital sign has gained attention in recent years owing to the oscillator has the frequency drift directly proportional to the subject's displacement and a high sensitivity. Even though the conventional SIL radar using injection-locking technique provides very high sensitivity to tiny vibration, frequency swing of wireless signal transmitted from the SIL radar may cause electromagnetic interference (EMI) to other wireless devices in the environment.

SUMMARY

The object of the present invention is to provide a FOSIL radar able to remain a constant transmit frequency to detect subject's vital sign without EMI issue.

A FOSIL radar of the present invention includes a first injection-locked oscillator (ILO), a second ILO, a first mixer, a signal transceiver, a second mixer, a third mixer and a demodulation unit. The first and second ILOs output a first oscillation signal and a second oscillation signal, respectively. The first mixer is coupled to the first and second ILOs to receive the first and second oscillation signals, and mix the first and second oscillation signals to produce a mixed signal. The signal transceiver is coupled to the first mixer, receives and transmits the mixed signal to a subject as a transmitted signal, and receives a reflected signal from the subject as a received signal. The second mixer is coupled to the signal transceiver and the second ILO, receives and mix the received signal and the second oscillation signal to output a first injection-locking signal. The first injection-locking signal is injected to lock the first ILO. The third mixer is coupled to the signal transceiver and the first ILO, receives and mix the received signal and the first oscillation signal to produce a second injection-locking signal. The second injection-locking signal is injected to lock the second ILO. The demodulation unit is coupled to the first ILO to receive and demodulate the first oscillation signal so as to obtain a vital-sign signal.

The present invention utilizes the first mixer to mix the first and second oscillation signals in order to cancel out the frequency drifts of the first and second oscillation signals caused by the Doppler shifts. Accordingly, the frequency of the transmitted signal radiated from the signal transceiver can be held constant to solve the problem of EMI.

DETAILED DESCRIPTION OF THE INVENTION

Figure 1:
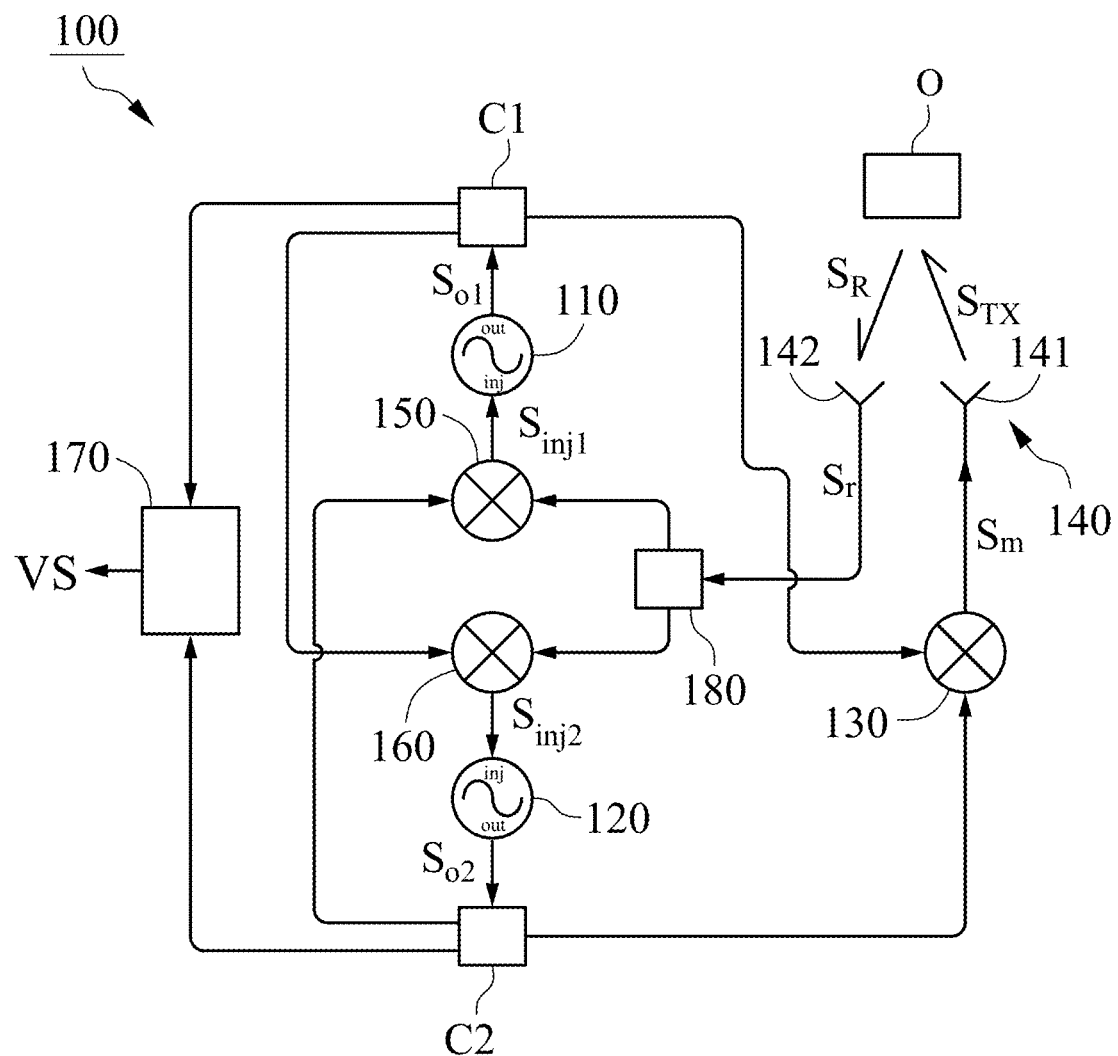
FIG. 1 is a circuit diagram illustrating a FOSIL radar in accordance with a first embodiment of the present invention.

With reference to FIG. 1, a FOSIL radar 100 in accordance with a first embodiment of the present invention includes a first injection-locked oscillator (ILO) 110, a second ILO 120, a first mixer 130, a signal transceiver 140, a second mixer 150, a third mixer 160, a demodulation unit 170 and a power splitter 180.

The first ILO 110 is a voltage-controlled oscillator used to generate a first oscillation signal $S_{o1}$ after receiving a control voltage (not shown). The first oscillation signal $S_{o1}$ is fed into a first coupler C1 and divided into three signals. The first mixer 130, the third mixer 160 and the demodulation unit 170 are electrically connected to the first coupler C1 to receive the first oscillation signal $S_{o1}$, respectively.

The second ILO 120 is also a voltage-controlled oscillator which receives a control voltage (not shown) to generate a second oscillation signal $S_{o2}$. The second oscillation signal $S_{o2}$ is delivered to a second coupler C2 to be divided into three signals. The first mixer 130, the second mixer 150 and the demodulation unit 170 are electrically connected to the second coupler C2 so as to receive the divided second oscillation signals $S_{o2}$, respectively.

The first mixer 130 receives the first oscillation signal $S_{o1}$ and the second oscillation signal $S_{o2}$ and mix them to output a mixed signal $S_m$. In the first embodiment, the first mixer 130 is an up mixer provided to produce the mixed signal $S_m$ with a frequency of the sum of the first oscillation signal $S_{o1}$ and the second oscillation signal $S_{o2}$. The frequency of the mixed signal $S_m$ is increased to improve the sensitivity of the FOSIL radar 100 to tiny vibration.

The signal transceiver 140 includes a transmit (TX) antenna 141 and a receive (RX) antenna 142. The TX antenna 141, electrically connected to the first mixer 130, receives and radiates the mixed signal $S_m$ to a subject O as a transmitted signal $S_{TX}$. The RX antenna 142 receives a reflected signal $S_R$ from the subject O as a received signal $S_r$. If the subject O has a movement relative to the TX antenna 141, the transmitted signal $S_{TX}$ may occur the Doppler effect to make the reflected signal $S_R$ and the received signal $S_r$ contain the Doppler signals caused by the movement of the subject O. Additionally, clutter reflected from the environment may be received by the RX antenna 142 of the signal transceiver 140 such that the reflected signal $S_R$ and the received signal $S_r$ may contain not only the Doppler signals due to the movement of the subject O but also clutters.

The power splitter 180 is electrically connected to the RX antenna 142 of the signal transceiver 140 to receive and split the received signal $S_r$ into two paths. The second mixer 150 is electrically connected to the power splitter 180, the second coupler C2 and the first ILO 110 to receive the received signal $S_r$ of one path from the power splitter 180 and the second oscillation signal $S_{o2}$ from the second coupler C2. The second mixer 150 mix the two signals to produce a first injection-locking signal $S_{inj1}$. The first injection-locking signal $S_{inj1}$ is injected into the first ILO 110 to make the first ILO 110 operate in a self-injection-locked state. The second mixer 150 of the first embodiment is a down mixer used to down-convert the received signal $S_r$ to the locking range of the first ILO 110 by the second oscillation signal $S_{o2}$. The received signal $S_r$ is injected to lock the first ILO 110 after down-conversion.

The third mixer 160 is electrically connected to the power splitter 180, the first coupler C1 and the second ILO 120. Consequently, the third mixer 160 receives the received signal $S_r$ of the other path from the power splitter 180 and the first oscillation signal $S_{o1}$ from the first coupler C1, mix them and output a second injection-locking signal $S_{inj2}$ to injection-lock the second ILO 120 in a self-injection-locked state. In the first embodiment, the third mixer 160 is a down mixer that uses the first oscillation signal $S_{o1}$ to down-convert the received signal $S_r$ to the locking range of the second ILO 120. Accordingly, the received signal $S_r$ is able to be injected to lock the second ILO 120 after down-conversion.

The received signal $S_r$ involves the Doppler signal caused by the movement of the subject O, as a result, the first ILO 110 and the second ILO 120 are injected with the first injection-locking signal $S_{inj1}$ and the second injection-locking signal $S_{inj2}$ with frequency modulation, and the information of the movement of the subject O can be detected by frequency demodulation of the first oscillation signal $S_{o1}$ or the second oscillation signal $S_{o2}$. As mentioned below, the frequency of the transmitted signal $S_{TX}$ can be held constant through the mixing of the first oscillation signal $S_{o1}$ and the second oscillation signal $S_{o2}$ by the first mixer 130.

In this embodiment, the frequency of the transmitted signal $S_{TX}$ radiated from the TX antenna 141 of the signal transceiver 140 is given by $$\omega_{TX}(t) = \omega_{out,A}(t) + \omega_{out,B}(t)$$

where $\omega_{TX}(t)$ denotes the frequency of the transmitted signal $S_{TX}$, $\omega_{out,A}(t)$ denotes the output frequency of the first ILO 110, $\omega_{out,B}(t)$ denotes the output frequency of the second ILO 120. Further, $\omega_{out,A}(t)$ and $\omega_{out,B}(t)$ are given by $$\omega_{out,A}(t) = \omega_{osc,A} - \omega_{LRc,A} \sin \alpha_{c,A} - \omega_{LRd,A} \sin \alpha_{d,A}(t)$$

$$\omega_{out,B}(t) = \omega_{osc,B} - \omega_{LRc,B} \sin \alpha_{c,B} - \omega_{LRd,B} \sin \alpha_{d,B}(t)$$

where $\omega_{osc,A}$ is the oscillation frequency of the first ILO 110, $\omega_{LRc,A}$ and $\omega_{LRd,A}$ are the locking ranges of the first ILO 110 for clutter and Doppler signals, respectively, $\alpha_{c,A}$ and $\alpha_{d,A}(t)$ are the phase shifts of the first ILO 110 corresponding to the clutter and Doppler signals, respectively, $\omega_{osc,B}$ is the oscillation frequency of the second ILO 120, $\omega_{LRc,B}$ and $\omega_{LRd,B}$ are the locking ranges of the second ILO 120 for the clutter and Doppler signals, respectively, $\alpha_{c,B}$ and $\alpha_{d,B}(t)$ are the phase shifts of the second ILO 120 caused by the clutter and Doppler signals, respectively. The locking ranges for both clutter and Doppler signals injected into the first ILO 110 and the second ILO 120 can be respectively given by $$\begin{cases} \omega_{LRc,A} = (\omega_{osc,A} \times E_{c,A}) / (2Q_A \times E_{osc,A}) \\ \omega_{LRd,A} = (\omega_{osc,A} \times E_{d,A}) / (2Q_A \times E_{osc,A}) \end{cases}$$

and $$\begin{cases} \omega_{LRc,B} = (\omega_{osc,B} \times E_{c,B}) / (2Q_B \times E_{osc,B}) \\ \omega_{LRd,B} = (\omega_{osc,B} \times E_{d,B}) / (2Q_B \times E_{osc,B}) \end{cases}$$

where $Q_A$ and $Q_B$ are the quality factors of the first ILO 110 and the second ILO 120, respectively, $E_{c,A}$ and $E_{d,A}$ are the amplitudes of the clutter and Doppler signals injected into the first ILO 110, respectively, $E_{c,B}$ and $E_{d,B}$ are the amplitudes of the clutter and Doppler signals injected into the second ILO 120, respectively, $E_{osc,A}$ and $E_{osc,B}$ are the amplitudes of free oscillation signals of the first ILO 110 and the second ILO 120, respectively.

Because of the phase delay $\xi$ and the attenuation L provided by the power splitter 180, the relationship between the phase shifts of the first ILO 110 and the second ILO 120 caused by the clutter and Doppler signals is given by $$\begin{cases} \alpha_{c,A} - \xi = \alpha_{c,B} \\ \alpha_{d,A}(t) - \xi = \alpha_{d,B}(t) \end{cases}$$

and the relationship between the amplitudes of the first ILO 110 and the second ILO 120 corresponding to the clutter and Doppler signals is given by $$\frac{E_{c,B}}{E_{c,A}} = \frac{E_{d,B}}{E_{d,A}} = L$$

When the phase delay $\xi$ and the attenuation L provided by the power splitter 180 satisfy conditions as follows $$\begin{cases} L = \dfrac{Q_B}{Q_A} \times \dfrac{\omega_{osc,A}}{\omega_{osc,B}} \times \dfrac{E_{osc,B}}{E_{osc,A}} \\ \xi = (2n+1)\pi, \ n \in N \end{cases}$$

the output frequencies of the first ILO 110 and the second ILO 120 can be rewritten as $$\begin{cases} \omega_{out,A}(t) = \omega_{osc,A} - \omega_s(t) \\ \omega_{out,B}(t) = \omega_{osc,B} + \omega_s(t) \end{cases}$$

where the shift frequency $\omega_s(t)$ is given by $$\omega_s(t) = \omega_{LRc,A} \sin \alpha_{c,A} + \omega_{LRd,A} \sin \alpha_{d,A}(t).$$

It can be seen that the first ILO 110 and the second ILO 120 of the FOSIL radar 100 have the same frequency swing range and opposite phase during the sensing period. Thus, the frequency of the transmitted signal $S_{TX}$ generated by the signal transceiver 140 can be given by $$\omega_{TX}(t) = \omega_{out,A}(t) + \omega_{out,B}(t) = \omega_{osc,A} + \omega_{osc,B}$$

the transmit frequency of the signal transceiver 140 can be fixed to resolve the EMI issue.

The first ILO 110 and the second ILO 120 are both injection-locked with the Doppler signal caused by the movement of the subject O so as to have frequency drifts. Accordingly, a vital-sign signal VS of the subject O can be detected through frequency demodulation of the first oscillation signal $S_{o1}$ from the first ILO 110 or the second oscillation signal $S_{o2}$ from the second ILO 120 performed by the demodulation unit 170.

Figure 2:
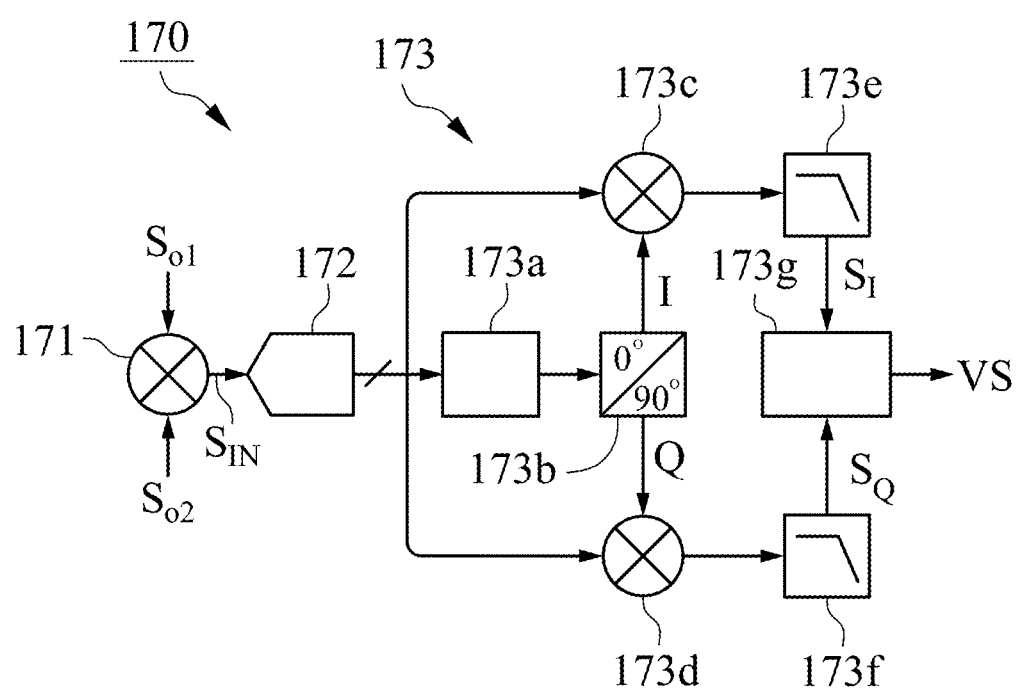
FIG. 2 is a circuit diagram illustrating a demodulation unit of the FOSIL radar in accordance with the first embodiment of the present invention.

Preferably, the first oscillation signal $S_{o1}$ and the second oscillation signal $S_{o2}$ are both frequency-demodulated by the demodulation unit 170 in the first embodiment to further improve the sensitivity of the FOSIL radar 100. With reference to FIGS. 1 and 2, the demodulation unit 170 includes a fourth mixer 171, an analog-to-digital converter (ADC) 172 and a frequency demodulator 173. The fourth mixer 171 is coupled to the first ILO 110 and the second ILO 120 via the first coupler C1 and the second coupler C2 such that it can receive and mix the first oscillation signal $S_{o1}$ and the second oscillation $S_{o2}$ to output a demodulation mixed signal $S_{IN}$.

The fourth mixer 171 of the first embodiment is a down mixer provided to generate an intermediate frequency signal having a frequency that is the oscillation frequency difference between the first oscillation signal $S_{o1}$ and the second oscillation signal $S_{o2}$. In order to retain the Doppler shift, a frequency difference between the initial oscillation frequencies of the first ILO 110 and the second ILO 120 is required to avoid zero frequency in the output of the fourth mixer 171.

In a different way, the demodulation unit 170 shown in FIG. 2 may perform frequency demodulation on only the first oscillation signal $S_{o1}$ or the second oscillation signal $S_{o2}$, and a sine wave signal without frequency modulation is fed into the fourth mixer 171. In other words, the first oscillation signal $S_{o1}$ and the sine wave signal without frequency modulation may be fed into the fourth mixer 171 via different ports to be mixed, or the second oscillation signal $S_{o2}$ and the sine wave signal without frequency modulation may be fed into the fourth mixer 171 via different ports to be mixed.

With reference to FIG. 2, the frequency demodulator 173 is a digital circuit in the first embodiment, for this reason, the demodulation mixed signal $S_{IN}$ has to be converted from analog to digital by the ADC 172. The ADC 172 is electrically connected to the fourth mixer 171 to receive and digitize the demodulation mixed signal $S_{IN}$ and then deliver the digital demodulation mixed signal $S_{IN}$ to the frequency demodulator 173. The frequency demodulator 173 is electrically connected to the ADC 172 to receive the digital demodulation mixed signal $S_{IN}$. The digital demodulation mixed signal $S_{IN}$ enter the frequency demodulator 173 to be frequency-demodulated to become the vital-sign signal VS. In different embodiment, the ADC 172 is not required while the frequency demodulator 173 is an analog circuit used to demodulate the analog demodulation mixed signal $S_{IN}$.

With reference to FIG. 2, the frequency demodulator 173 is built as a low IF (intermediate frequency) architecture including a delay element 173*a*, a quadrature power splitter 173*b*, a first multiplier 173*c*, a second multiplier 173*d*, a first low-pass filter 173*e*, a second low-pass filter 173*f* and an arctangent demodulator 173*g*. The delay element 173*a* is coupled to the fourth mixer 171 via the ADC 172 to receive the digital demodulation mixed signal $S_{IN}$, and is provided to delay the digital demodulation mixed signal $S_{IN}$ to output a delayed signal. The quadrature power splitter 173*b* is electrically connected to the delay element 173*a* to receive the delayed signal, and the quadrature power splitter 173*b* is provided to output an in-phase signal I and a quadrature signal Q. The first multiplier 173*c* is coupled to the ADC 172 and quadrature power splitter 173*b* to receive the digital demodulation mixed signal $S_{IN}$ and the in-phase signal I and able to output a first multiplied signal. The second multiplier 173*d* is coupled to the ADC 172 and the quadrature power splitter 173*b* to receive the digital demodulation mixed signal $S_{IN}$ and the quadrature signal Q and provided to produce a second multiplied signal. The first low-pass filter 173*e* is electrically connected to the first multiplier 173*c* to receive the first multiplied signal, and the first multiplied signal is filtered by the first low-pass filter 173*e* to become an in-phase demodulated signal $S_I$. The second low-pass filter 173*f* is electrically connected to the second multiplier 173*d* to receive the second multiplied signal, and filters the second multiplied signal to output a quadrature demodulated signal $S_Q$. The arctangent demodulator 173*g* is electrically connected to the first low-pass filter 173*e* and the second low-pass filter 173*f* to receive the in-phase demodulated signal $S_I$ and the quadrature demodulated signal $S_Q$, and outputs the vital-sign signal VS.

Figure 3:
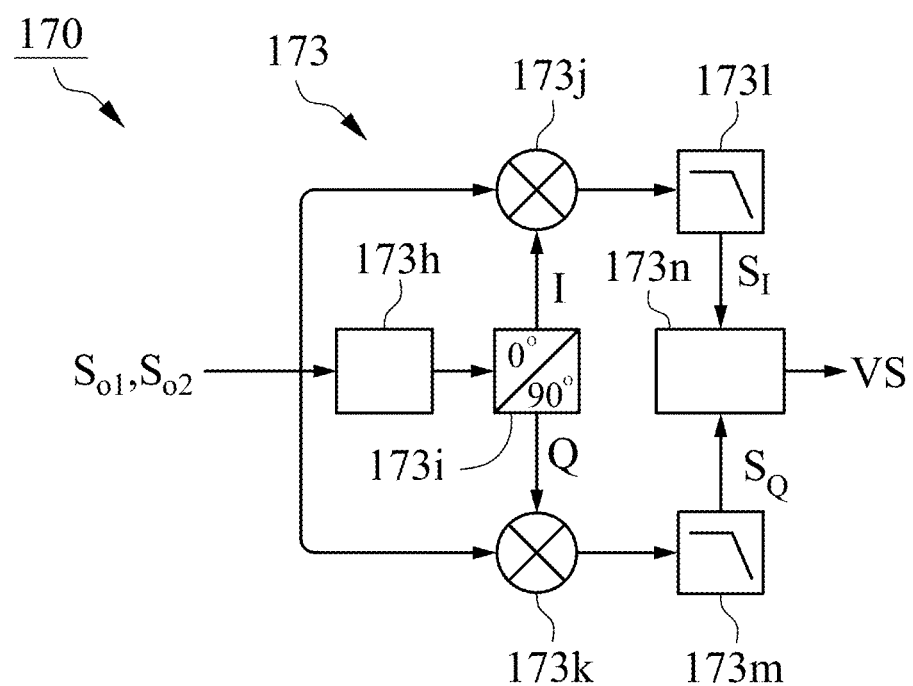
FIG. 3 is a circuit diagram illustrating a demodulation unit of the FOSIL radar in accordance with the first embodiment of the present invention.

Different to the architecture of the demodulation unit 170 shown in FIG. 2, FIG. 3 shows another architecture of a demodulation unit 170 that uses only one of the first oscillation signal $S_{o1}$ and the second oscillation signal $S_{o2}$ and has no the fourth mixer 171. The first oscillation signal $S_{o1}$ and the second oscillation signal $S_{o2}$ are RF (radio frequency) signals so one of them is delivered to the frequency demodulator 173 with analog circuit design to be demodulated directly for extracting the vital-sign signal VS of the subject O. The analog frequency demodulator 173 of this embodiment is built as a RF architecture including a delay element 173*h*, a quadrature power splitter 173*i*, a fifth mixer 173*j*, a sixth mixer 173*k*, a first low-pass filter 173*l*, a second low-pass filter 173*m* and an arctangent demodulator 173*n*. The delay element 173*h* receives and delay the first oscillation signal $S_{o1}$ or the second oscillation signal $S_{o2}$ to output a delayed signal. The quadrature power splitter 173*i* is electrically connected to the delay element 173*h* to receive the delayed signal, and outputs an in-phase signal I and a quadrature signal Q. The fifth mixer 173*j* receives the in-phase signal I and also receives the first oscillation signal $S_{o1}$ or the second oscillation signal $S_{o2}$ to output a first mixed signal. The sixth mixer 173*k* receives not only the quadrature signal Q but also one of the first oscillation signal $S_{o1}$ and the second oscillation signal $S_{o2}$ to output a second mixed signal. The first low-pass filter 173*l* is electrically connected to the fifth mixer 173*j* to receive the first mixed signal and configured to filter the first mixed signal to produce an in-phase demodulated signal $S_I$. The second low-pass filter 173*m* is electrically connected to the sixth mixer 173*k* to receive the second mixed signal and provided to filter the second mixed signal to output a quadrature demodulated signal $S_Q$. The arctangent demodulator 173*n* is electrically connected to the first low-pass filter 173*l* and the second low-pass filter 173*m* to receive the in-phase demodulated signal $S_I$ and the quadrature demodulated signal $S_Q$, and outputs the vital-sign signal VS.

The FOSIL radar 100 of the present invention has high sensitivity to tiny vibration due to self-injection-locked mechanism such that it can be used to detect vital signs of biological subject. Moreover, the FOSIL radar 100 of the present invention provides the first mixer 130 to mix the first oscillation signal $S_{o1}$ of the first ILO 110 and the second oscillation signal $S_{o2}$ of the second ILO 120 so the transmitted signal $S_{TX}$ transmitted from the signal transceiver 140 can be held at constant frequency to resolve the problem of EMI.

Figure 4:
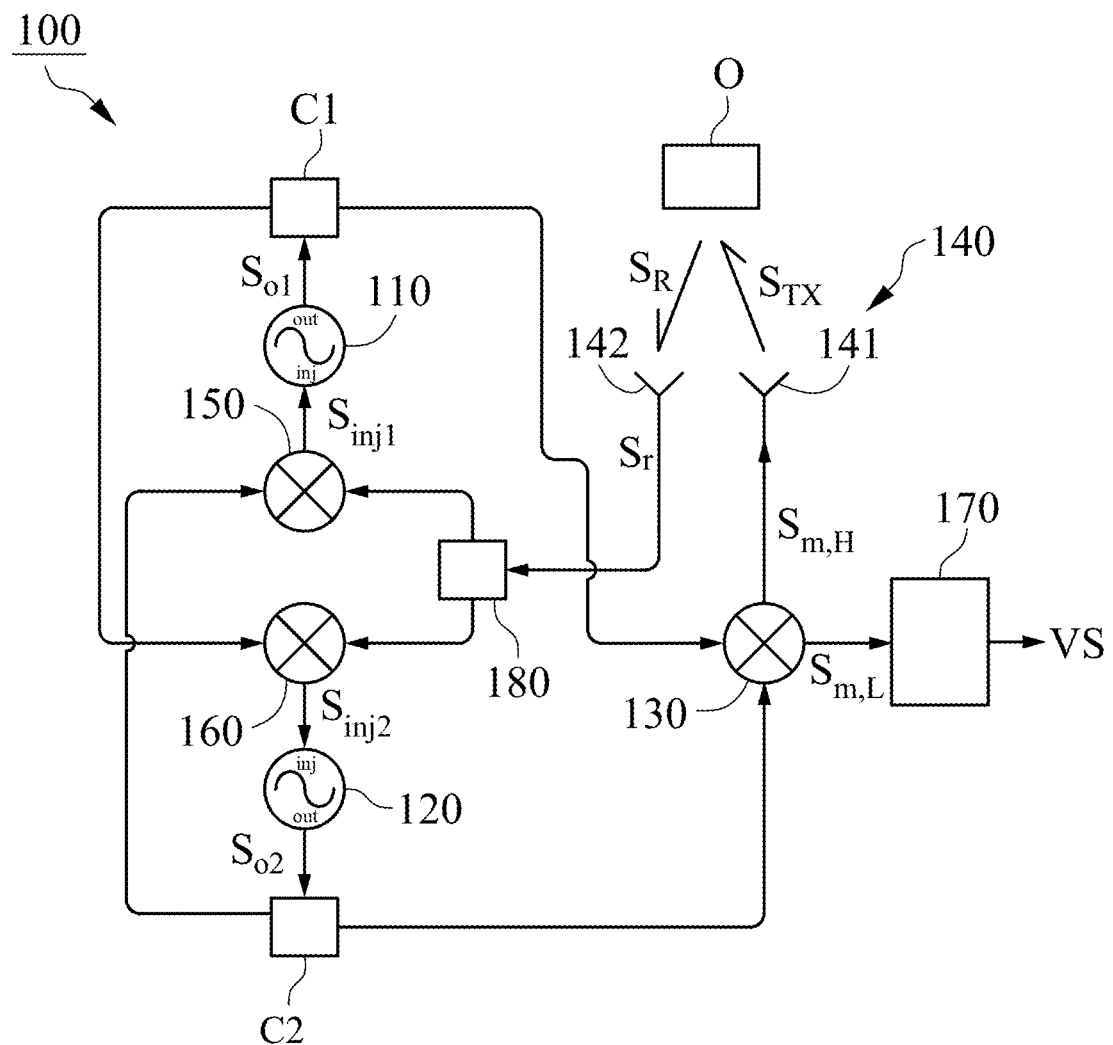
FIG. 4 is circuit diagram illustrating a FOSIL radar in accordance with a second embodiment of the present invention.
Figure 5:
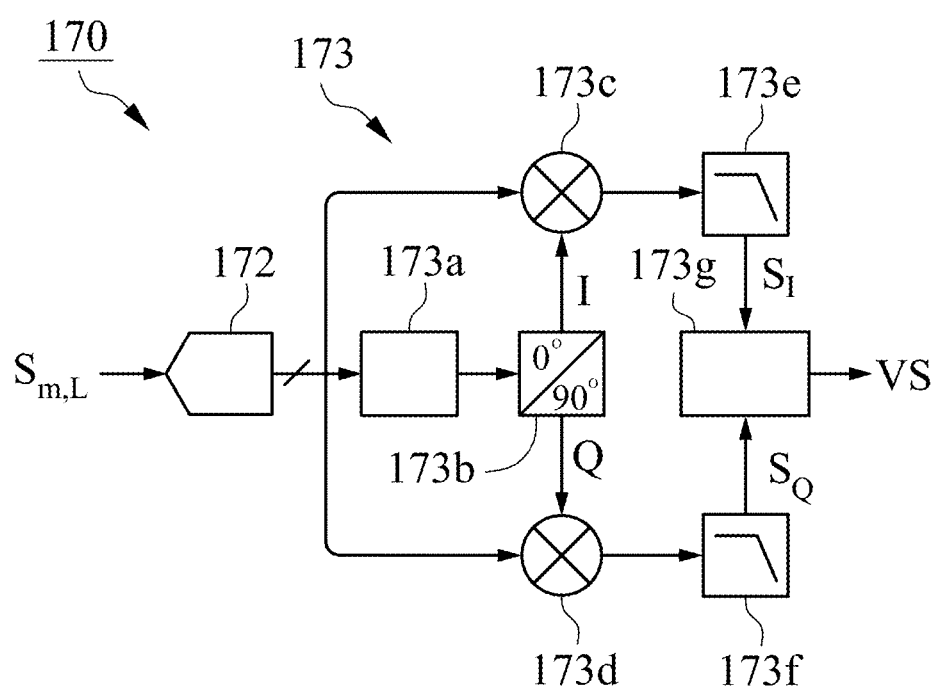
FIG. 5 is a circuit diagram illustrating a demodulation unit of the FOSIL radar in accordance with the second embodiment of the present invention.

With reference to FIG. 4, a FOSIL radar 100 of a second embodiment of the present invention differs from that of the first embodiment by using the first mixer 130 to mix the first oscillation signal $S_{o1}$ and the second oscillation signal $S_{o2}$ to generate a high-frequency mixed signal $S_{m,H}$ and low-frequency mixed signal $S_{m,L}$. The high-frequency mixed signal $S_{m,H}$ is sent to the signal transceiver 140 to be transmitted as the transmitted signal $S_{TX}$ via the TX antenna 141. The frequency of the high-frequency mixed signal $S_{m,H}$ is the sum of the frequencies of the first oscillation signal $S_{o1}$ and the second oscillation signal $S_{o2}$ so it is constant to keep a constant frequency of the transmitted signal $S_{TX}$. The low-frequency mixed signal $S_{m,L}$ has a frequency drift associated with the Doppler signal such that the demodulation unit 170 electrically connected to the first mixer 130 can receive and demodulate the low-frequency mixed signal $S_{m,L}$ to acquire the vital-sign signal VS. As shown in FIG. 5, the low-frequency mixed signal $S_{m,L}$ is delivered to the ADC 172 to be converted into a digital signal and then delivered to the frequency demodulator 173 to be frequency-demodulated. In other embodiment, the low-frequency mixed signal $S_{m,L}$ can be demodulated by an analog frequency demodulator without the requirement of additional ADC 172.

Figure 6:
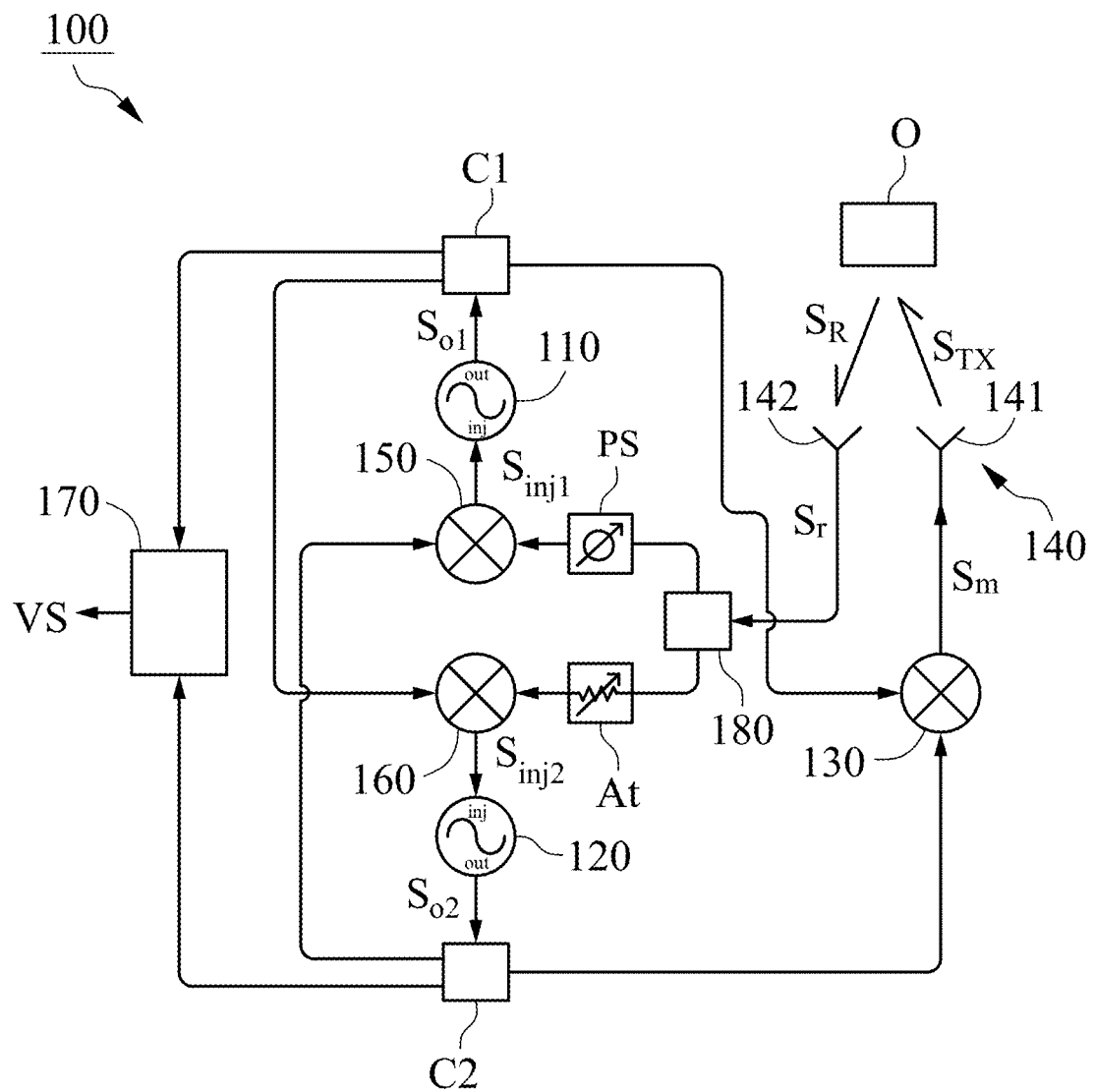
FIG. 6 is a circuit diagram illustrating a FOSIL radar in accordance with a third embodiment of the present invention.

With reference to FIG. 6, a FOSIL radar 100 of a third embodiment of the present invention further includes a phase shifter PS and an attenuator At, different to that of the first embodiment. The phase shifter PS is electrically connected to the power splitter 180 and the second mixer 150 and provided to shift the received signal $S_r$ of one path from the power splitter 180 and deliver the received signal $S_r$ with phase shift to the second mixer 150. The attenuator At is electrically connected to the power splitter 180 and the third mixer 160 and used to adjust the amplitude of the received signal $S_r$ of the other path from the power splitter 180 and send the received signal $S_r$ with amplitude adjustment to the third mixer 160. The phase shifter PS and the attenuator At are used to complement the phase delay and attenuation provided by the power splitter 180 to the required level such that the frequency of the transmitted signal $S_{TX}$ transmitted from the signal transceiver 140 remains constant.

Figure 7:
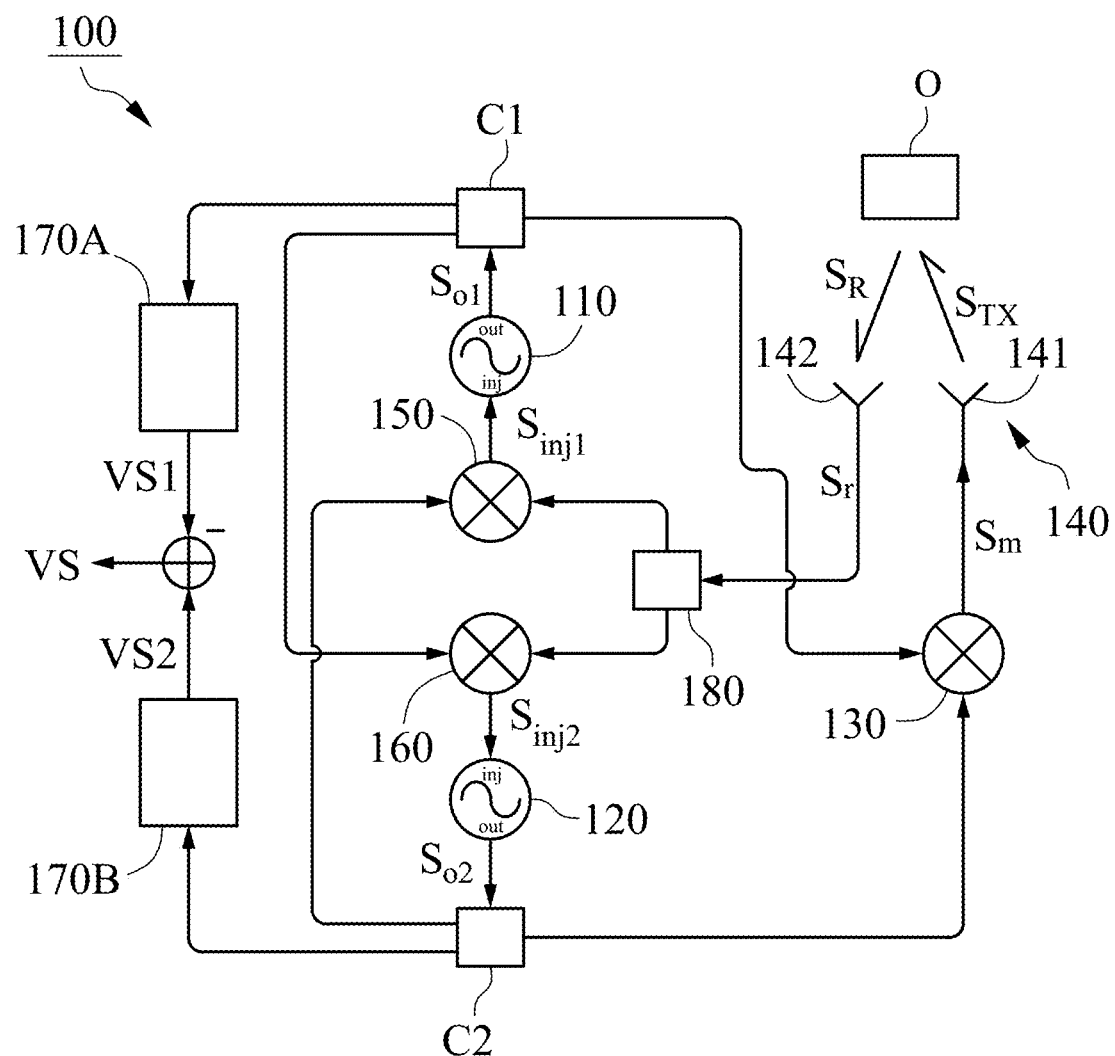
FIG. 7 is a circuit diagram illustrating a FOSIL radar in accordance with a fourth embodiment of the present invention.

With reference to FIG. 7, a FOSIL radar 100 of a fourth embodiment is different than that of the first embodiment in a first demodulation unit 170A, a second demodulation unit 170B and a subtractor S. In the fourth embodiment, the first oscillation signal $S_{o1}$ of the first ILO 110 and the second oscillation signal $S_{o2}$ of the second ILO 120 are demodulated by the first demodulation unit 170A and the second demodulation unit 170B, respectively to become a first vital-sign signal VS1 and a second vital-sign signal VS2, and the vital-sign signal VS is obtained by a subtraction of the first vital-sign signal VS1 and the second vital-sign signal VS2 in the subtractor S. The first demodulation unit 170A is electrically connected to the first coupler C1 to receive the first oscillation signal $S_{o1}$ and demodulates the first oscillation signal $S_{o1}$ to generate the first vital-sign signal VS1, and the second demodulation unit 170B is electrically connected to the second coupler C2 to receive the second oscillation signal $S_{o2}$ and demodulates the second oscillation signal $S_{o2}$ to obtain the second vital-sign signal VS2. The subtractor S is electrically connected to the first demodulation unit 170A and the second demodulation unit 170B so as to receive and subtract the first vital-sign signal VS1 and the second vital-sign signal VS2 to get the vital-sign signal VS. The architectures of the first demodulation unit 170A and the second demodulation unit 170B of this embodiment are not repeated here because they can be the same with that in FIG. 3, or the same with that in FIG. 2 receiving a sine wave signal without frequency modulation from the other end of the fourth mixer 171.

Owing to the first oscillation signal $S_{o1}$ and the second oscillation signal $S_{o2}$ exhibit opposite frequency drifts, the Doppler signals in the first vital-sign signal VS1 and the second vital-sign signal VS2 that are generated through demodulation performed by the first demodulation unit 170A and the second demodulation unit 170B also have the opposite basebands. Accordingly, the vital-sign signal VS, that is acquired by subtracting one of the first vital-sign signal VS1 and the second vital-sign signal VS2 from the other using the subtractor S, has significant Doppler signal for better demodulation performance.

Figure 8:
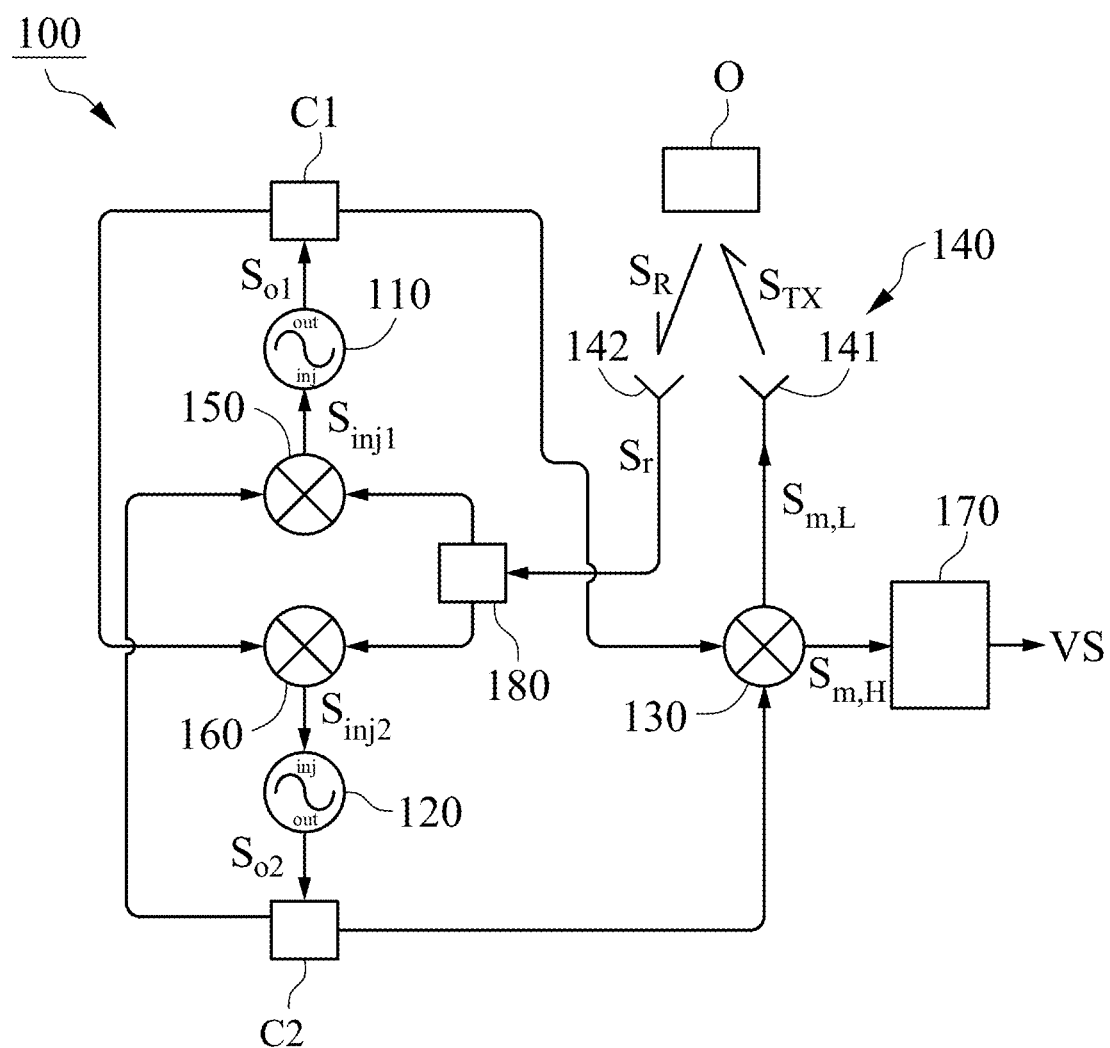
FIG. 8 is a circuit diagram illustrating a FOSIL radar in accordance with a fifth embodiment of the present invention.

A FOSIL radar 100 of a fifth embodiment of the present invention is presented in FIG. 8. Different to the first embodiment, the first mixer 130 of the fifth embodiment mix the first oscillation signal $S_{o1}$ and the second oscillation signal $S_{o2}$ to output a low-frequency mixed signal $S_{m,L}$ and a high-frequency mixed signal $S_{m,H}$, and the second mixer 150 and the third mixer 160 of the fifth embodiment are up mixers. The low-frequency mixed signal $S_{m,L}$ is delivered from the first mixer 130 to the signal transceiver 140 and transmitted as the transmitted signal $S_{TX}$ from the TX antenna 141, and the high-frequency mixed signal $S_{m,H}$ is fed into the demodulation unit 170 to be demodulated. The second mixer 150 up-converts the received signal $S_r$ and the second oscillation signal $S_{o2}$ into the first injection-locking signal $S_{inj1}$, and the third mixer 160 up-converts the received signal $S_r$ and the first oscillation signal $S_{o1}$ into the second injection-locking signal $S_{inj2}$. In this embodiment, while the phase delay and the attenuation provided by the power splitter 180 match the following conditions $$\begin{cases} L = \dfrac{Q_B}{Q_A} \times \dfrac{\omega_{osc,A}}{\omega_{osc,B}} \times \dfrac{E_{osc,B}}{E_{osc,A}} \\ \xi = 2n\pi, n \in N \end{cases}$$

the output frequencies of the first ILO 110 and the second ILO 120 can be given by $$\begin{cases} \omega_{out,A}(t) = \omega_{osc,A} - \omega_s(t) \\ \omega_{out,B}(t) = \omega_{osc,B} - \omega_s(t) \end{cases}$$

$$\omega_s(t) = \omega_{LRc,A}\sin\alpha_{c,A} + \omega_{LRd,A}\sin\alpha_{d,A}(t).$$

Consequently, the low-frequency mixed signal $S_{m,L}$, that is produced by the first mixer 130 and transmitted as the transmitted signal $S_{TX}$ from the signal transceiver 140, has a frequency given by $$\omega_{TX}(t) = \omega_{out,A}(t) - \omega_{out,B}(t) = \omega_{osc,A} - \omega_{osc,B}$$

to allow the transmitted signal $S_{TX}$ from the signal transceiver 140 to remain a constant frequency without the EMI issue. Furthermore, the low-frequency mixed signal $S_{m,L}$ generated by the first mixer 130 can make the transmitted signal $S_{TX}$ have a lower frequency with less attenuation so as to increase the penetration capability and detection distance of the FOSIL radar 100.

Figure 9:
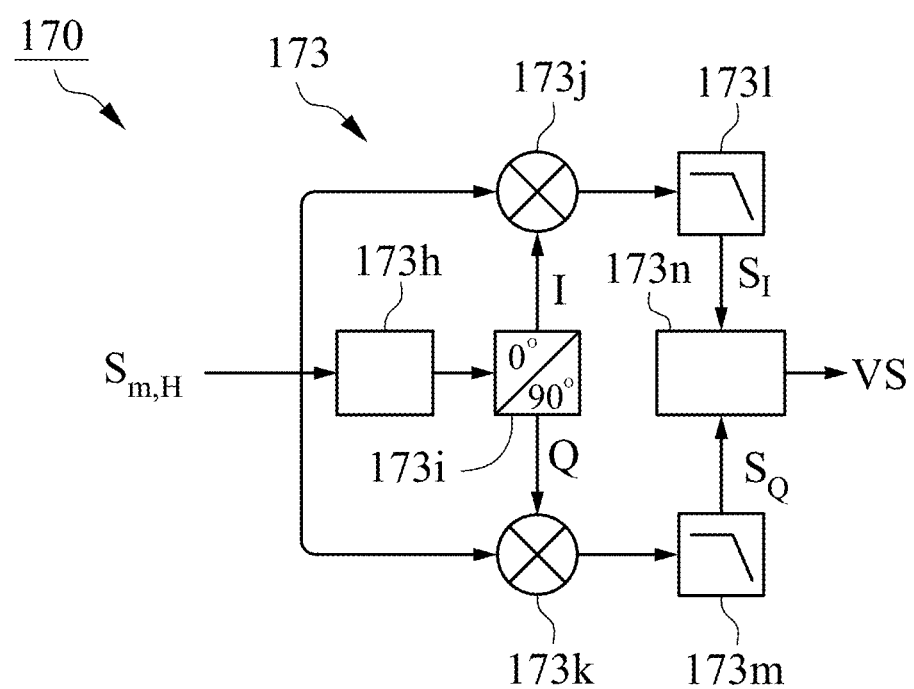
FIG. 9 is a circuit diagram illustrating a demodulation unit of the FOSIL radar in accordance with the fifth embodiment of the present invention.

With reference to FIG. 8, the frequency of the low-frequency mixed signal $S_{m,L}$ is held constant and the high-frequency mixed signal $S_{m,H}$ remains the frequency drift caused by the Doppler signal, consequently, the demodulation unit 170 of the fifth embodiment can receive and demodulate the high-frequency mixed signal $S_{m,H}$ generated by the first mixer 130 to obtain the vital-sign signal VS. As shown in FIG. 9, the frequency demodulator 173 of the demodulation unit 170 is also built as the same RF architecture as that shown in FIG. 3 because the high-frequency mixed signal $S_{m,H}$ is a RF signal. Hence, the demodulation unit 170 can demodulate the high-frequency mixed signal $S_{m,H}$ produced by the first mixer 130 to acquire the vital-sign signal VS.

In the FOSIL radar 100 of the present invention, the first mixer 130 is provided to mix the first oscillation signal $S_{o1}$ and the second oscillation signal $S_{o2}$ such that the frequency drifts of the first oscillation signal $S_{o1}$ and the second oscillation signal $S_{o2}$ caused by the Doppler signals injected into the first ILO 110 and the second ILO 120 are able to be eliminated and the frequency of the transmitted signal $S_{TX}$ radiated from the signal transceiver 140 remains constant without the EMI issue.

The scope of the present invention is only limited by the following claims. Any alternation and modification without departing from the scope and spirit of the present invention will become apparent to those skilled in the art.

What is claimed is:

1. A frequency-offset self-injection-locked (FOSIL) radar comprising:
    a first injection-locked oscillator (ILO) configured to output a first oscillation signal;
    a second ILO configured to output a second oscillation signal;
    a first mixer coupled to the first and second ILOs and configured to receive and mix the first and second oscillation signals to output a mixed signal;
    a transmit antenna coupled to the first mixer and configured to receive and transmit the mixed signal to a subject as a transmitted signal;
    a receive antenna configured to receive a reflected signal from the subject as a received signal;
    a second mixer coupled to the receive antenna and the second ILO and configured to receive and mix the received signal and the second oscillation signal to output a first injection-locking signal, the first injection-locking signal is configured to injection-lock the first ILO;
    a third mixer coupled to the receive antenna and the first ILO and configured to receive and mix the received signal and the first oscillation signal to output a second injection-locking signal, the second injection-locking signal is configured to injection-lock the second ILO; and
    a frequency demodulator coupled to the first ILO and configured to receive and demodulate the first oscillation signal to obtain a vital-sign signal of the subject.

2. The FOSIL radar in accordance with claim 1 further comprising a first coupler, wherein the first coupler is electrically connected to the first ILO and configured to receive the first oscillation signal, the first oscillation signal is configured to be divided into three paths by the first coupler and fed into the first mixer, the third mixer and the frequency demodulator, respectively.

3. The FOSIL radar in accordance with claim 2 further comprising a second coupler, wherein the second coupler is electrically connected to the second ILO and configured to receive the second oscillation signal, the second oscillation signal is configured to be divided into three paths by the second coupler and fed into the first mixer, the second mixer and the frequency demodulator, respectively, and the frequency demodulator is configured to perform a demodulation according to the first and second oscillation signals to obtain the vital-sign signal.

4. The FOSIL radar in accordance with claim 1 further comprising a power splitter, wherein the power splitter is electrically connected to the receive antenna and configured to receive the received signal, the received signal is configured to be divided into two paths by the power splitter and fed into the second mixer and the third mixer, respectively.

5. The FOSIL radar in accordance with claim 4 further comprising a phase shifter and an attenuator, wherein the phase shifter is electrically connected to the power splitter and the second mixer, configured to phase-shift the received signal of one path from the power splitter and configured to deliver the received signal with phase shift to the second mixer, the attenuator is electrically connected to the power splitter and the third mixer, configured to adjust an amplitude of the received signal of the other path from the power splitter and configured to deliver the received signal with adjusted amplitude to the third mixer.

6. The FOSIL radar in accordance with claim 1,
    wherein the frequency demodulator includes a fourth mixer, a delay element, a quadrature power splitter, a first multiplier, a second multiplier, a first low-pass filter, a second low-pass filter and an arctangent demodulator, the fourth mixer is coupled to the first and second ILOs and configured to receive and mix the first and second oscillation signals to output a demodulation mixed signal, the delay element is coupled to the fourth mixer and configured to receive the demodulation mixed signal and output a delayed signal, the quadrature power splitter is electrically connected to the delay element and configured to receive the delayed signal and output an in-phase signal and a quadrature signal, the first multiplier is coupled to the fourth mixer and the quadrature power splitter and configured to receive the demodulation mixed signal and the in-phase signal and output a first multiplied signal, the second multiplier is coupled to the fourth mixer and the quadrature power splitter and configured to receive the demodulation mixed signal and the quadrature signal and output a second multiplied signal, the first low-pass filter is electrically connected to the first multiplier and configured to receive the first multiplied signal and output an in-phase demodulated signal, the second low-pass filter is electrically connected to the second multiplier and configured to receive the second multiplied signal and output a quadrature demodulated signal, the arctangent demodulator is electrically connected to the first and second low-pass filters and configured to receive the in-phase and quadrature demodulated signals and output the vital-sign signal.

7. The FOSIL radar in accordance with claim 6,
    wherein the frequency demodulator further includes an analog-to-digital converter (ADC) and the delay element, a quadrature power splitter, a first multiplier, a second multiplier, a first low-pass filter, a second low-pass filter and an arctangent demodulator are combined in a digital circuit, the ADC is electrically connected to the fourth mixer and configured to receive and digitize the demodulation mixed signal, the digital demodulation mixed signal is configured to be delivered to the digital circuit for frequency demodulation.

8. The FOSIL radar in accordance with claim 1,
    wherein the frequency demodulator includes a delay element, a quadrature power splitter, a fifth mixer, a sixth mixer, a first low-pass filter, a second low-pass filter and an arctangent demodulator, the delay element is configured to receive and delay the first oscillation signal to output a delayed signal, the quadrature power splitter is electrically connected to the delay element and configured to receive the delayed signal and output an in-phase signal and a quadrature signal, the fifth mixer is configured to receive the in-phase signal and the first oscillation signal and output a first mixed signal, the sixth mixer is configured to receive the quadrature signal and the first oscillation signal and output a second mixed signal, the first low-pass filter is electrically connected to the fifth mixer and configured to receive and filter the first mixed signal to output an in-phase demodulated signal, the second low-pass filter is electrically connected to the sixth mixer and configured to receive and filter the second mixed signal to output a quadrature demodulated signal, the arctangent demodulator is electrically connected to the first and second low-pass filters and configured to receive the in-phase and quadrature demodulated signals and output the vital-sign signal.

9. The FOSIL radar in accordance with claim 1,
wherein the first mixer is configured to mix the first and second oscillation signals to output a high-frequency mixed signal and a low-frequency mixed signal, the high-frequency mixed signal is configured to be delivered to the transmit antenna and transmitted as the transmitted signal, and the low-frequency mixed signal is configured to be received and demodulated by the frequency demodulator that is electrically connected to the first mixer.

10. The FOSIL radar in accordance with claim 1,
wherein the first mixer is configured to mix the first and second oscillation signals to output a high-frequency mixed signal and a low-frequency mixed signal, the low-frequency mixed signal is configured to be delivered to the transmit antenna and transmitted as the transmitted signal, and the high-frequency mixed signal is configured to be received and demodulated by the frequency demodulator that is electrically connected to the first mixer.

11. The FOSIL radar in accordance with claim 1, wherein there is a frequency difference between oscillation frequencies of the first and second ILOs.

\* \* \* \* \*